(12) United States Patent
Yu

(10) Patent No.: US 8,136,733 B1
(45) Date of Patent: Mar. 20, 2012

(54) VCSEL BARCODE SCANNER

(75) Inventor: Ho-Yeh Yu, Taipei Hsien (TW)

(73) Assignee: Marson Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 13/005,207

(22) Filed: Jan. 12, 2011

(51) Int. Cl.
*G06K 7/10* (2006.01)
*G02B 5/00* (2006.01)

(52) U.S. Cl. .......... 235/462.01; 235/462.32; 235/462.42

(58) Field of Classification Search . 235/462.01–462.45
See application file for complete search history.

(56) References Cited

U.S. PATENT DOCUMENTS

| | | | |
|---|---|---|---|
| 6,616,046 B1 * | 9/2003 | Barkan et al. | 235/462.29 |
| 6,691,919 B1 * | 2/2004 | Katz et al. | 235/462.01 |
| 7,090,132 B2 * | 8/2006 | Havens et al. | 235/454 |
| 7,380,721 B2 * | 6/2008 | Zhang | 235/462.43 |
| 2008/0128506 A1 * | 6/2008 | Tsikos et al. | 235/462.42 |
| 2008/0230611 A1 * | 9/2008 | Sprague et al. | 235/462.22 |
| 2008/0308639 A1 * | 12/2008 | Stern et al. | 235/462.32 |

* cited by examiner

*Primary Examiner* — Daniel Hess
(74) *Attorney, Agent, or Firm* — Muncy, Geissler, Olds & Lowe, PLLC

(57) ABSTRACT

A vertical cavity surface emitting laser (VCSEL) barcode scanner uses a VCSEL light source module as a required light source for scanning or reading a barcode. Since a vertical cavity features extremely small thickness, capability of generating a longitudinal single-mode, low current, low power consumption, and high stability, components of the scanner can be miniaturized, thereby reducing the manufacturing cost and assembly difficulty and improving the practicability of the product.

11 Claims, 9 Drawing Sheets

VCSEL BARCODE SCANNER

BACKGROUND OF THE INVENTION

1. Field of the Invention

The present invention relates to a vertical cavity surface emitting laser (VCSEL) barcode scanner for scanning or reading a barcode, and more particularly to a scanner that uses a VCSEL light source module as a required light source for scanning a barcode.

2. Related Art

A conventional laser barcode reader usually adopts an edge emitting laser as its light source, matches a refractor with a light source module, and enables the refractor to relatively swing by using a swing motor. When the light source module emits a light to the refractor, the refractor may irradiate the light to a barcode. After the light is irradiated to the barcode, a reflected light is generated, and the reflected light is then emitted to a sensor inside the reader through a light path, such that the sensor detects the reflected light, and interprets related information from the barcode. However, since the members and the assembly process of the laser barcode reader are complicated, and the thickness of an edge emitting laser cavity is approximately above 300 mm, the members inside the reader cannot be miniaturized. Based on the above reasons, the miniaturized design of the barcode reader still cannot be realized. In this case, an insurmountable barrier exists if it is desired to further combine the reader with an existing handheld electronic device (such as a handheld phone).

SUMMARY OF THE INVENTION

Accordingly, the present invention is directed to a VCSEL barcode scanner, which can be miniaturized to reduce the manufacturing cost and assembly difficulty.

In order to achieve the above objective, in the VCSEL barcode scanner of the present invention, a VCSEL module used as a required light source for scanning or reading a barcode is mainly electrically assembled on a circuit substrate. Since a thickness of a cavity of the VCSEL module is approximately smaller than 1 mm, main components of the present invention can be miniaturized, so as to reduce the manufacturing cost and assembly difficulty.

In order to make the Examiner clearly understand the contents of the present invention, a detailed description is given below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
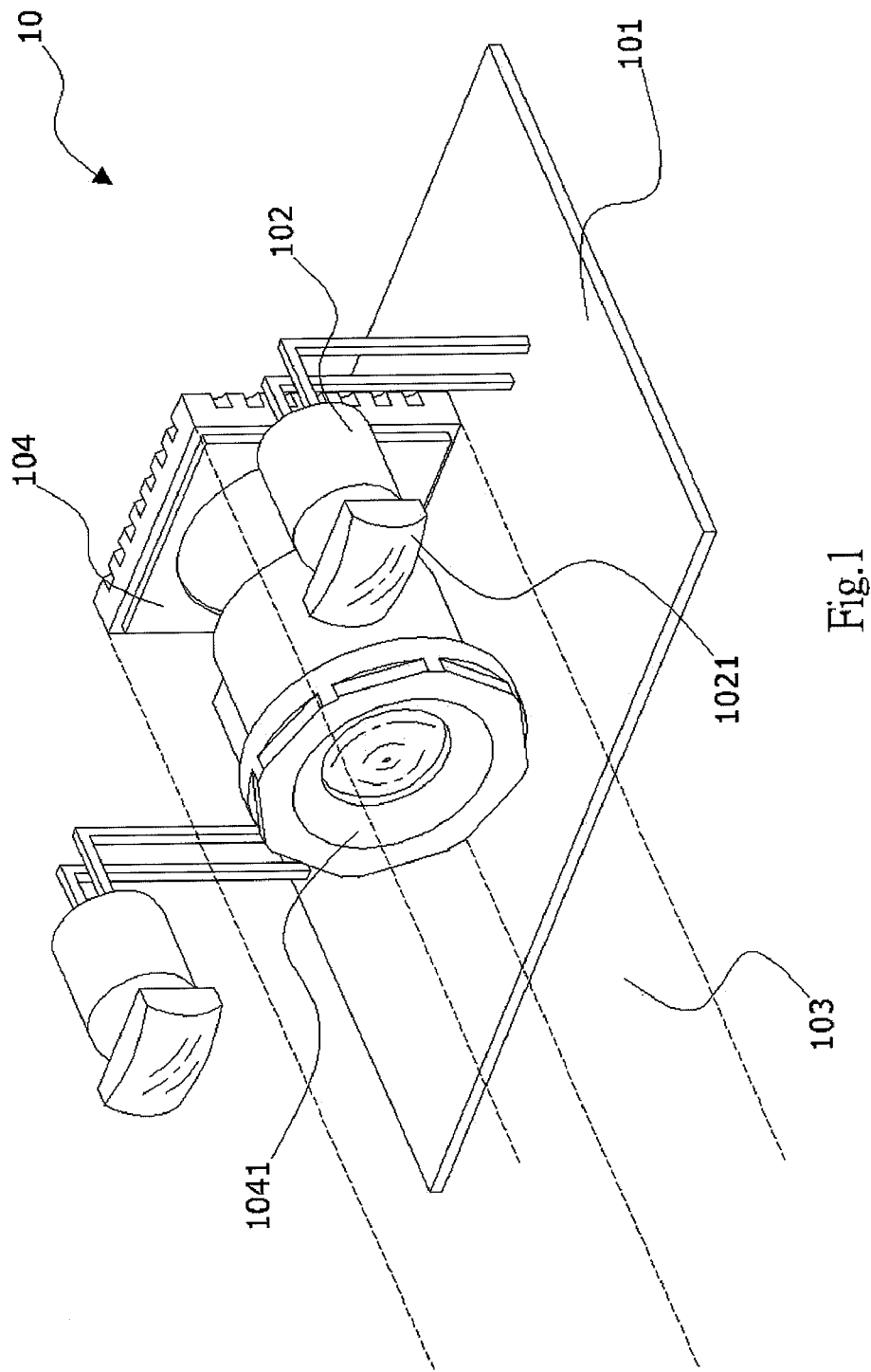
FIG. 1 is a schematic three-dimensional outside view of the present invention.

FIG. 1 is a schematic three-dimensional outside view of the present invention. Referring to FIG. 1, a VCSEL barcode scanner 10 includes a circuit substrate 101, a VCSEL module 102, a reflected light path 103, and a sensor 104. A circuit for electrically assembling electronic components is electrically arranged on a surface of the circuit substrate 101. The VCSEL module 102 is electrically assembled on the circuit substrate 101. A vertical cavity has an extremely small thickness, and features longitudinal single-mode, low current, low power consumption, and high stability. Further, a condenser 1021 is assembled in front of the VCSEL module 102, such that a light source emitted by the VCSEL module 102 is enabled to penetrate the condenser 1021 and produce a focusing effect. The reflected light path 103, which allows a light to pass through, is formed in a space above the surface of the circuit substrate 101. The sensor 104 is located in the reflected light path 103, and is vertically and electrically assembled on the circuit substrate 101. A lens group 1041, capable of focusing and irradiating the light emitted from the outside to the sensor 104, is disposed in front of the sensor 104.

Figure 2:
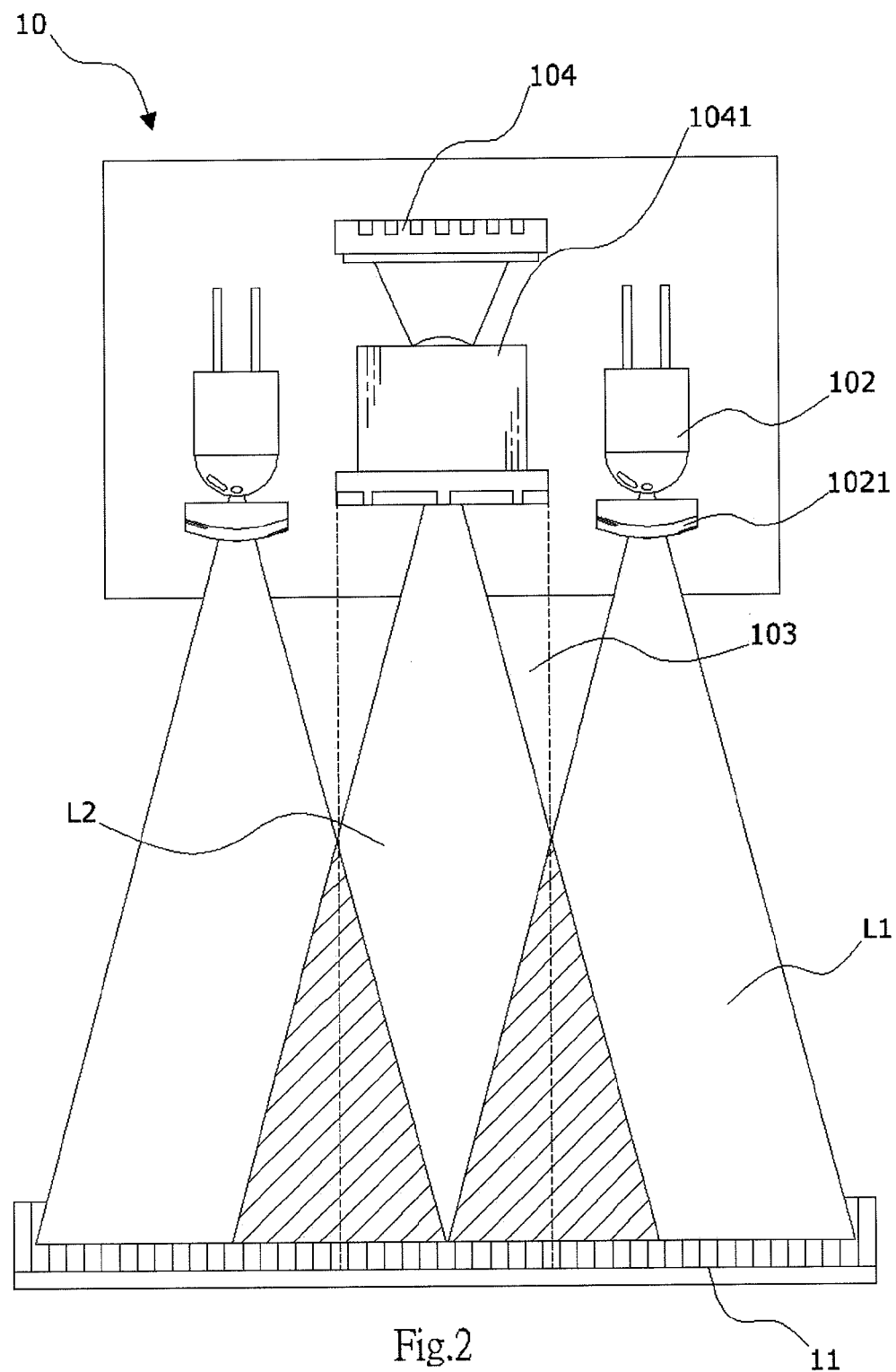
FIG. 2 is a schematic implementation view of the present invention.

FIG. 2 is a schematic implementation view of the present invention. The VCSEL module 102 uses a laser with a 650 nm wavelength as a projection light source, which is a visible light. As shown in FIG. 2, during the implementation, the VCSEL module 102 is driven in advance to emit a light source L1, and the emitted light source L1 is irradiated on a barcode 11 by passing through the condenser 1021. After the light source L1 is irradiated on the barcode 11, a reflected light L2 is generated. The reflected light L2, entering the reflected light path 103, is focused and irradiated on the sensor 104 through the lens group 1041, and is received by the sensor 104. In the present invention, since the thickness of the cavity of the VCSEL module 102 is extremely small, the main components of the present invention can be manufactured into miniaturized components, to achieve an efficacy of miniaturization. Furthermore, the barcode 11 may be of various types, for example, a one-dimensional barcode or a two-dimensional barcode.

Figure 3:
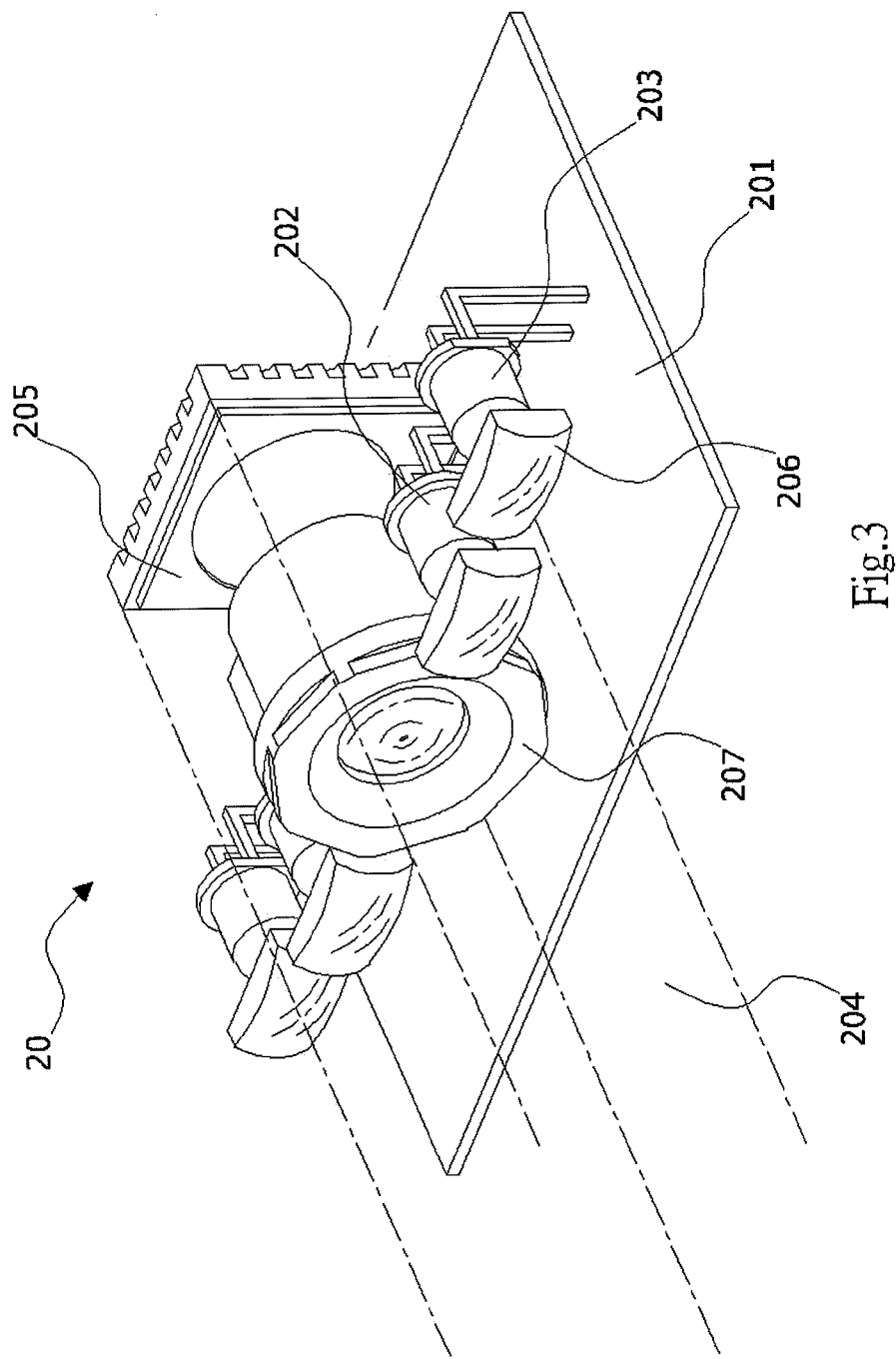
FIG. 3 shows a first embodiment of the present invention.

FIG. 3 shows a first embodiment of the present invention. Referring to FIG. 3, a VCSEL barcode scanner 20 includes a circuit substrate 201, a light emitting diode (LED) light source module 202, a VCSEL module 203, a reflected light path 204, and a sensor 205. A circuit for electrically assembling electronic components is arranged on a surface of the circuit substrate 201. The LED light source module 202 and the VCSEL module 203 are respectively electrically assembled on the surface of the circuit substrate 201. A condenser 206 for focusing the light source is respectively assembled at light source transmitting terminals of the LED light source module 202 and the VCSEL module 203. The reflected light path 204, which allows a light source to pass through, is formed in a space above the surface of the circuit substrate 201. The sensor 205 is vertically assembled on the circuit substrate 201, and is located in the reflected light path 204. A lens group 207, capable of focusing and irradiating the light emitted from the outside to the sensor 205, is disposed in front of the sensor 205.

Figure 4:
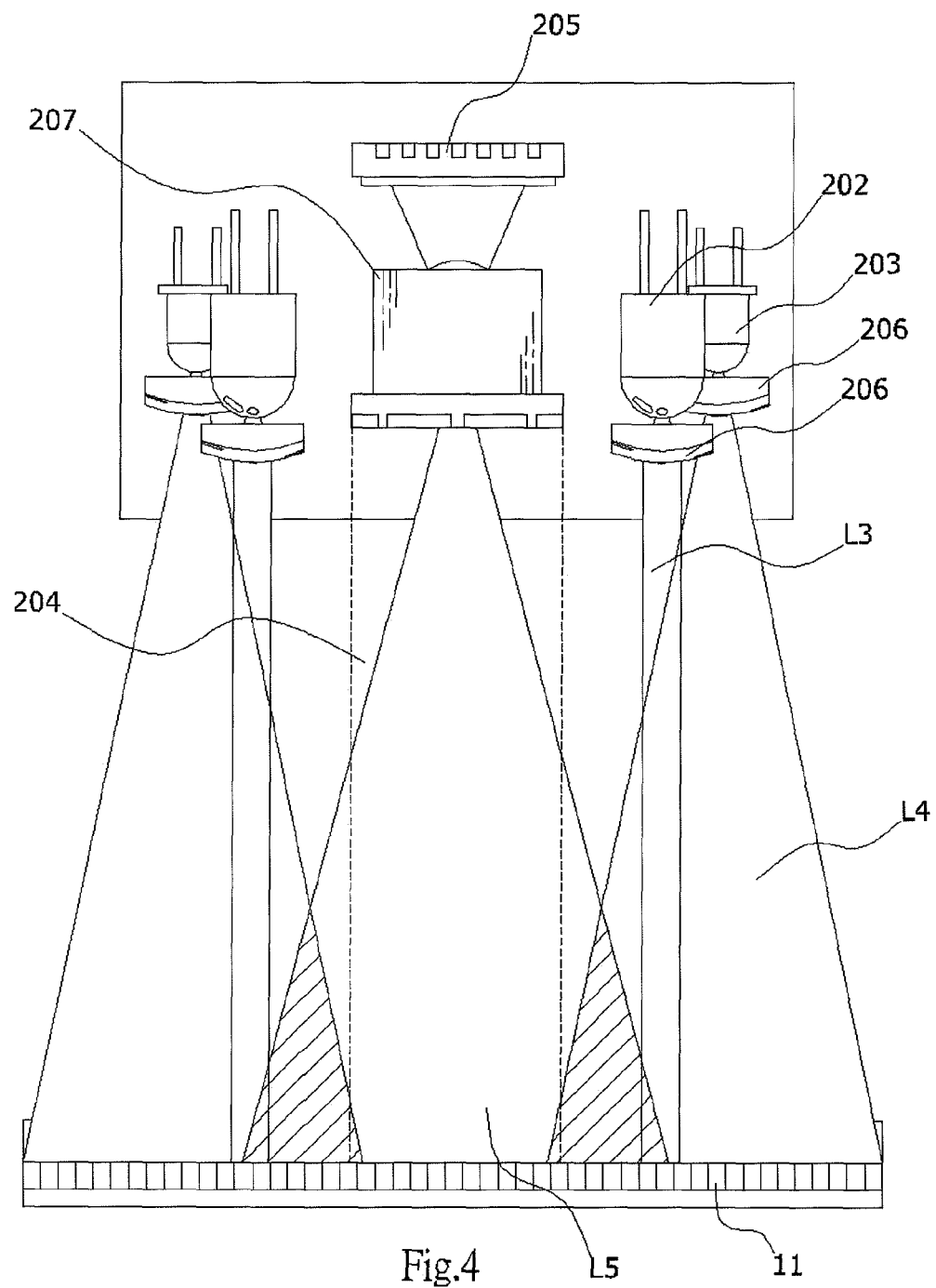
FIG. 4 is a schematic implementation view of the first embodiment.

FIG. 4 is a schematic implementation view of the first embodiment. The VCSEL module 203 uses a laser with an 850 nm wavelength as a projection light source, which is an invisible light source. Accordingly, since the light source emitted by the VCSEL module 203 is an invisible light, during the operation, the LED light source module 202 can be synchronously driven to emit a light source L3. A spot generated by the emitted light source L3 passing through the condenser 206 is taken as a directional locating point, which enables an operator to point to the barcode 11 based on a position of the locating point. A color of a light of the LED light source module 202 may be varied, such as red, green, and blue. In order to increase intensity of an indication light source, the LED light source module 202 may be replaced by another laser light source module. The VCSEL module 203 emits a light source L4, which is irradiated on the barcode 11 by passing through the condenser 206. After the light source L4 is irradiated on the barcode 11, a reflected light L5 is generated. The reflected light L5 passes through the reflected light path 204, and is then focused and irradiated on the sensor 205 for completing the reception through the lens group 207.

Figure 5:
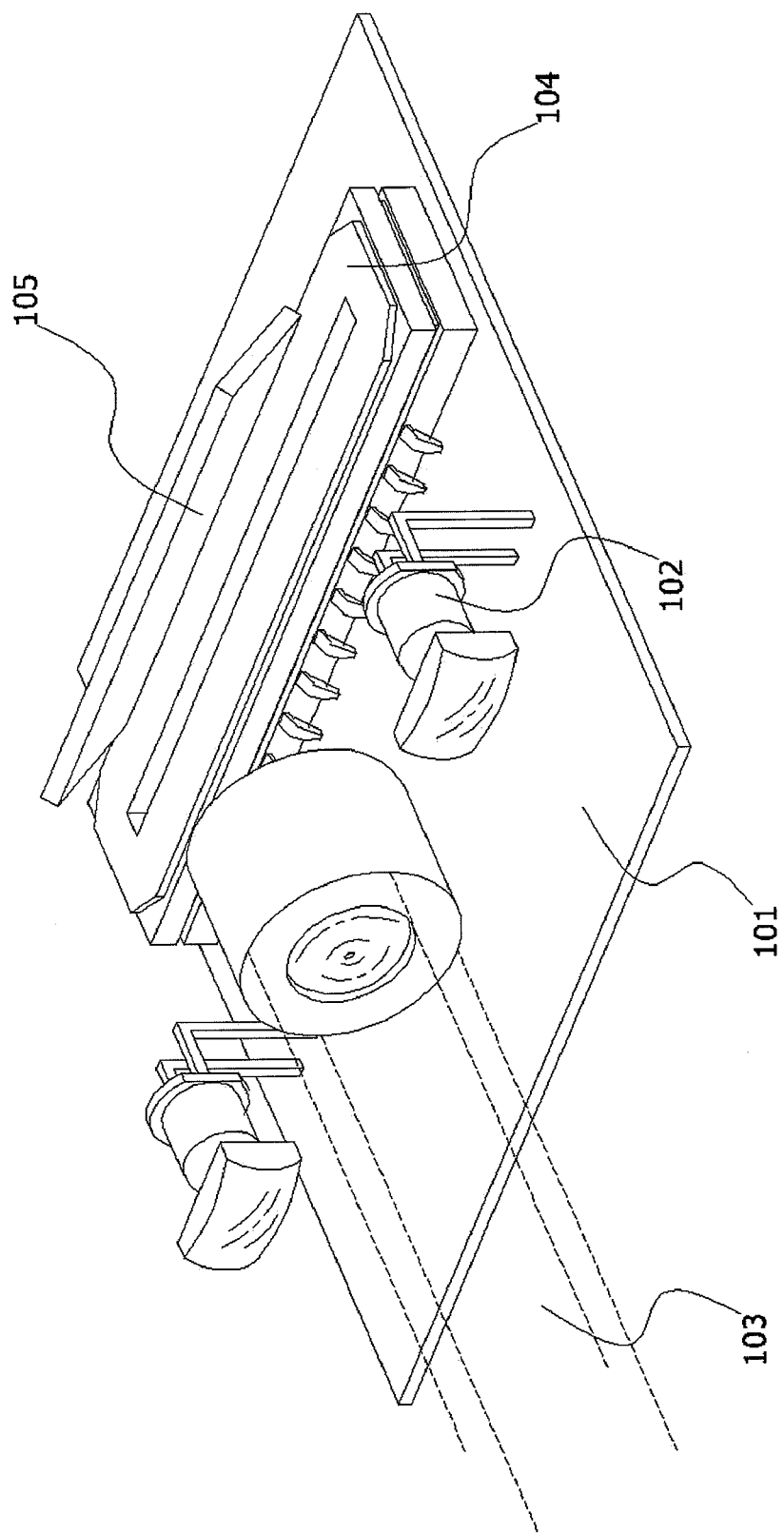
FIG. 5 shows a second embodiment of the present invention.

FIG. 5 shows a second embodiment of the present invention. Accordingly, in the present invention, the VCSEL module 102 is used as a required light source for scanning and reading a barcode. Since the vertical cavity features extremely small thickness, the components of the scanner can be miniaturized. In order to enhance the effect of miniaturization, the sensor 104 is horizontally assembled on the surface of the circuit substrate 101, a refractor 105 is assembled on top of the sensor 104, and the refractor 105 corresponds to the reflected light path 103.

Figure 6:
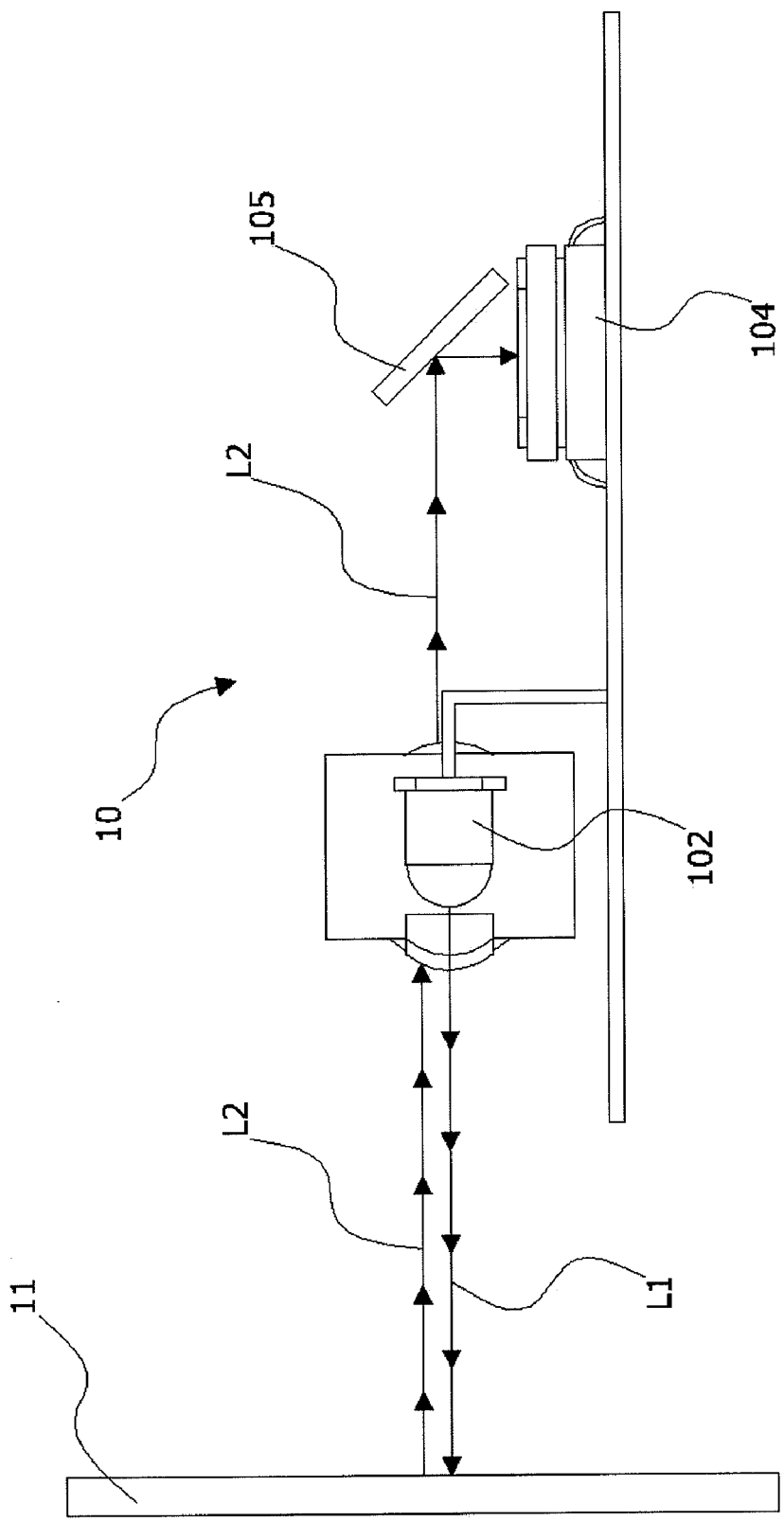
FIG. 6 is a schematic implementation view of the second embodiment.

FIG. 6 is a schematic implementation view of the second embodiment. Referring to FIG. 6, during the implementation of the VCSEL barcode scanner 10, the VCSEL module 102 is driven in advance to emit a light source L1, so that the light source L1 is irradiated on the barcode 11, and a reflected light L2 is generated. The reflected light L2 is irradiated on the refractor 105 after passing through the reflected light path 103 (as shown in FIG. 5). The refractor 105 can be used to generate a refracted effect, so as to project the reflected light L2 to the sensor 104 for completing the reception.

Figure 7:
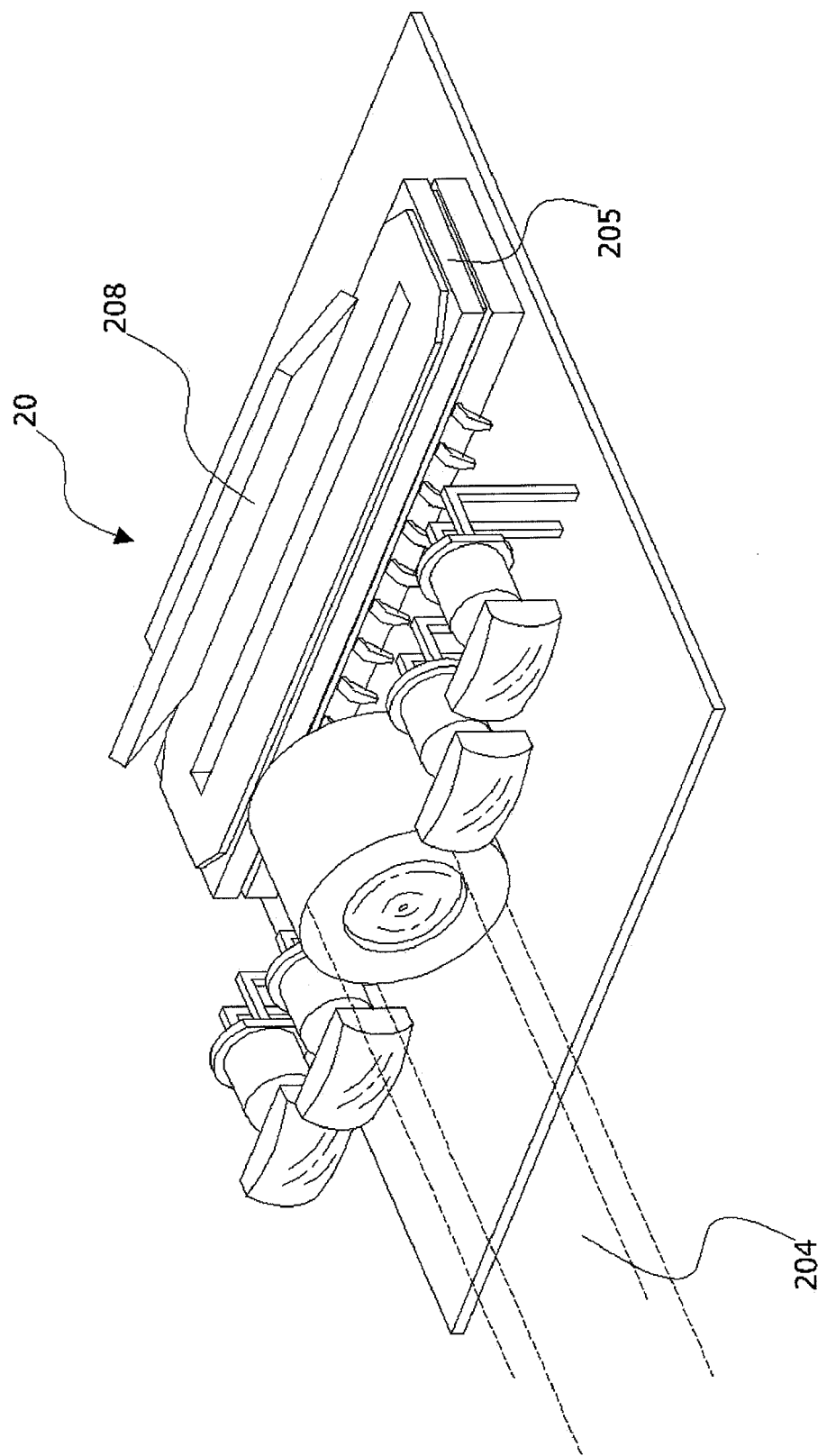
FIG. 7 shows a third embodiment of the present invention.

FIG. 7 shows a third embodiment of the present invention. As shown in FIG. 7, in order to meet the demand of miniaturization, in the present invention, the sensor 205 is assembled in parallel with the surface of the circuit substrate 201, a refractor 208 is assembled on top of the sensor 205, and the refractor 208 corresponds to the reflected light path 204.

Figure 8:
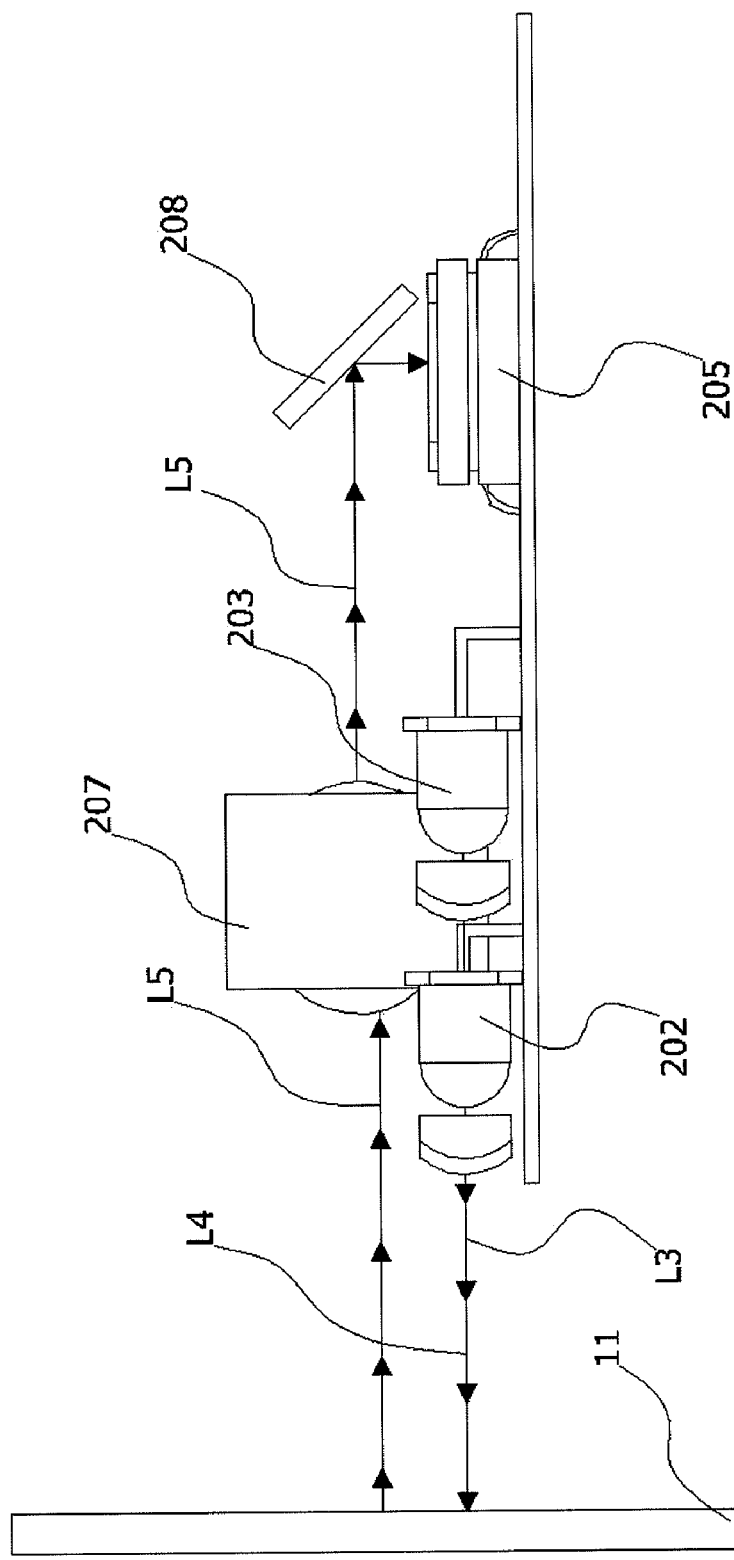
FIG. 8 is a schematic implementation view of the third embodiment.

FIG. 8 is a schematic implementation view of the third embodiment. During the implementation, since the light source emitted by the VCSEL module 203 is an invisible light, during the operation, it is necessary to drive the LED light source module 202 in advance to emit a light source L3 as a directional locating point, and thus an operator can point to the barcode 11 based on a position of the locating point. In addition, a color of a light emitted by the LED light source module 202 may be varied, such as red, green, and blue. Furthermore, the VCSEL module 203 further emits a light source L4 to be irradiated on the barcode 11 and generate a reflected light L5. The reflected light L5 passes through the reflected light path 204 (as shown in FIG. 7), and is irradiated on the refractor 208 after being focused by the lens group 207. Then, the refractor 208 projects the reflected light L5 to the sensor 205, so that the sensor 205 receives the reflected light L5.

Figure 9:
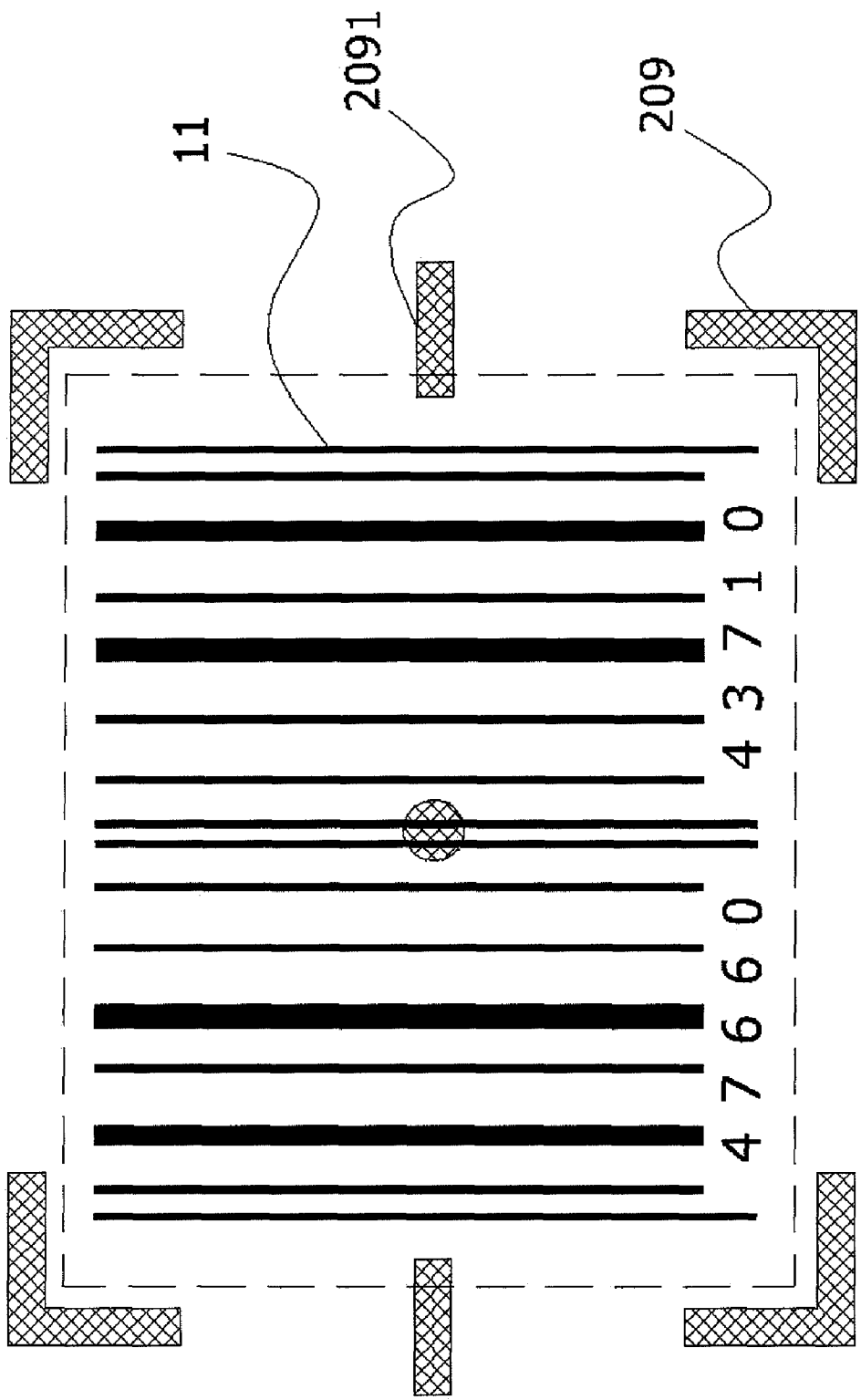
FIG. 9 shows a fourth embodiment of the present invention.

Accordingly, FIG. 9 shows a fourth embodiment of the present invention. The LED light source module 202, which originally acts as a location indicator, may be replaced by a laser light source module, so as to enhance the intensity of the light source for indicating the position. Furthermore, a condenser capable of forming a frame can be further disposed in front of the laser light source module. As shown in FIG. 9, when the laser light source module used as an indicator operates, a target area 209 is formed to enable a user to point to the barcode 11 to be scanned within a range defined by the target area 209. The range defined by the target area 209 is an area where the light source (an invisible light) emitted by the VCSEL module 203 is irradiated. As shown in FIG. 9, a standard line 2091 for the user to perform alignment can be further formed in the formed target area 209.

Based on the above, upon the implementation of the VCSEL barcode scanner of the present invention, since the VCSEL light source module is used as the required light source for scanning or reading a barcode, and the vertical cavity features extremely small thickness, capability of generating a longitudinal single-mode, low current, low power consumption, and high stability, a VCSEL barcode scanner that can be miniaturized to actually reduce the manufacturing cost and assembly difficulty can be obtained.

The above description is merely preferred embodiments of the present invention, but is not intended to limit the scope of the present invention. All the equivalent variations and modifications made by persons skilled in the art without departing from the spirit of the present invention should fall within the scope of the claims of the present invention.

What is claimed is:

1. A vertical cavity surface emitting laser (VCSEL) barcode scanner for scanning a barcode, comprising:
    a circuit substrate, arranged with a circuit;
    a VCSEL module, assembled on the circuit substrate, for generating a laser light source, wherein the laser light source is projected on the barcode to produce a reflected light;
    a reflected light path, formed in a space above a surface of the circuit substrate, so that the reflected light passes through the reflected light path, the VCSEL module being in a same plane as the reflected light path, which plane is parallel to the circuit substrate; and
    a sensor, assembled on the circuit substrate, for receiving the reflected light.

2. The VCSEL barcode scanner according to claim 1, wherein a lens group is assembled in the reflected light path, the lens group being side-by-side with the VCSEL module and being in the same plane as the reflected light path and the VCSEL module.

3. The VCSEL barcode scanner according to claim 1, wherein the sensor is horizontally assembled on the circuit substrate, a refractor is assembled on top of the sensor, and the refractor corresponds to the reflected light path.

4. The VCSEL barcode seamier according to claim 1, wherein a condenser is assembled in front of the VCSEL module.

5. The VCSEL barcode scanner according to claim 1, wherein a wavelength of the laser light source emitted by the VCSEL module is a visible light, and the wavelength of the laser light source is 650 nm.

6. The VCSEL barcode scanner according to claim 1, wherein a wavelength of the laser light source emitted by the VCSEL module is an invisible light, and the wavelength of the laser light source is 850 nm.

7. The VCSEL barcode scanner according to claim 6, wherein a light emitting diode (LED) light source module is assembled on the circuit substrate, and a light wavelength emitted by the LED light source module is a visible light.

8. The VCSEL barcode scanner according to claim 7, wherein a color of a light emitted by the LED light source module is any one of red, green, and blue.

9. The VCSEL barcode scanner according to claim 7, wherein another laser diode light source module is assembled on the circuit substrate, and a light wavelength emitted by the laser diode light source module is a visible light.

10. The VCSEL barcode scanner according to claim 9, wherein the laser diode light source module forms a target area.

11. The VCSEL barcode scanner according to claim 1, wherein the plane with the VCSEL module and the reflected light path is horizontal.

* * * * *